(12) United States Patent
Holemans

(10) Patent No.: US 10,703,512 B2
(45) Date of Patent: Jul. 7, 2020

(54) PRINTED SPACECRAFT SEPARATION SYSTEM

(71) Applicant: Walter Holemans, Washington, DC (US)

(72) Inventor: Walter Holemans, Washington, DC (US)

(73) Assignee: Planetary Systems Corporation, Silver Spring, MD (US)

( * ) Notice: Subject to any disclaimer, the term of this patent is extended or adjusted under 35 U.S.C. 154(b) by 463 days.

(21) Appl. No.: 15/624,904

(22) Filed: Jun. 16, 2017

(65) Prior Publication Data

US 2017/0283097 A1 Oct. 5, 2017

Related U.S. Application Data

(62) Division of application No. 14/506,588, filed on Oct. 3, 2014, now Pat. No. 9,707,748.

(60) Provisional application No. 61/887,616, filed on Oct. 7, 2013.

(51) Int. Cl.
| | |
|---|---|
| *B64G 1/64* | (2006.01) |
| *B33Y 10/00* | (2015.01) |
| *B33Y 50/02* | (2015.01) |
| *B33Y 80/00* | (2015.01) |

(52) U.S. Cl.
CPC ............. *B64G 1/641* (2013.01); *B33Y 10/00* (2014.12); *B33Y 50/02* (2014.12); *B33Y 80/00* (2014.12)

(58) Field of Classification Search
CPC ......... B33Y 80/00; B33Y 10/00; B33Y 50/02; B64G 1/641
See application file for complete search history.

(56) References Cited

U.S. PATENT DOCUMENTS

| | | | | |
|---|---|---|---|---|
| 3,809,002 | A * | 5/1974 | Nagy | B63B 21/58 114/249 |
| 4,518,277 | A * | 5/1985 | Bush | B64G 1/641 403/102 |
| 5,104,070 | A * | 4/1992 | Johnson | B64G 1/646 244/172.4 |
| 5,439,310 | A * | 8/1995 | Evenson | B64G 1/641 403/18 |
| 5,743,492 | A * | 4/1998 | Chan | B64F 1/04 102/274 |
| 9,231,323 | B1 * | 1/2016 | Jaeger | F16L 37/002 |

(Continued)

*Primary Examiner* — Brian M O'Hara
*Assistant Examiner* — Keith L Dixon
(74) *Attorney, Agent, or Firm* — Robert M. McDermott

(57) ABSTRACT

A spacecraft coupling system includes a locking component that can be deformed and placed into a stable state that locks one component into a mating component, and can easily be released from the deformed state, decoupling the two components. The locking component may include a central ring, a plurality of leaf elements arranged at the perimeter of the locking component, and a plurality of fins that extend outward from the ring to the plurality of leaf elements. A rotation of the ring element while the component is held stationary causes the fins to urge the leaf elements toward the receiving surface areas and to subsequently tension the leaf elements against surfaces on the mating component. To reduce cost and complexity, the locking component comprises a metal, such as titanium, that can be formed using an additive manufacturing process, commonly termed a 3-D printing process.

20 Claims, 4 Drawing Sheets

(56) References Cited

U.S. PATENT DOCUMENTS

2002/0164204 A1* 11/2002 Kaszubowski ........ B64G 1/641
                                                403/322.1
2012/0000575 A1*  1/2012 Yandle ................... F16L 37/35
                                                141/98

* cited by examiner

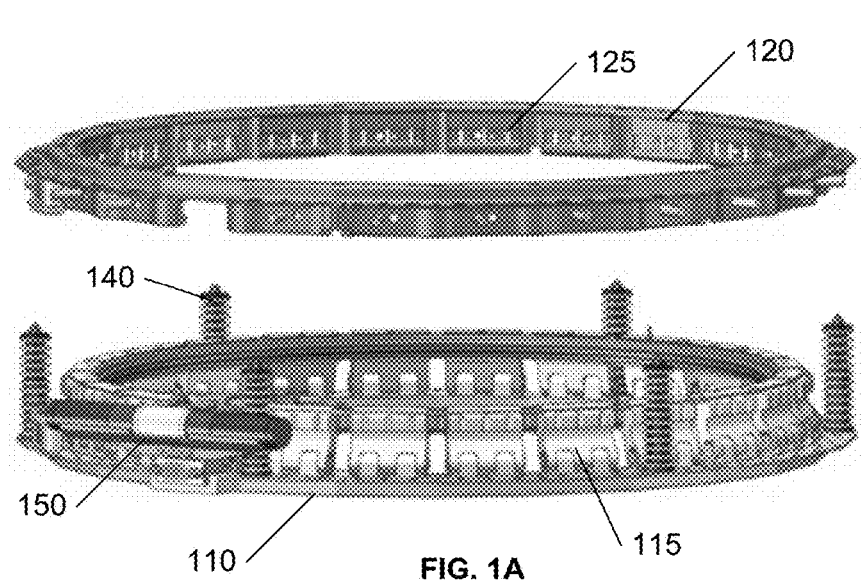
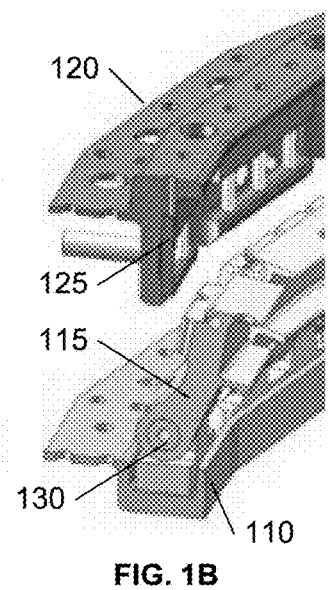
FIG. 1A  FIG. 1B
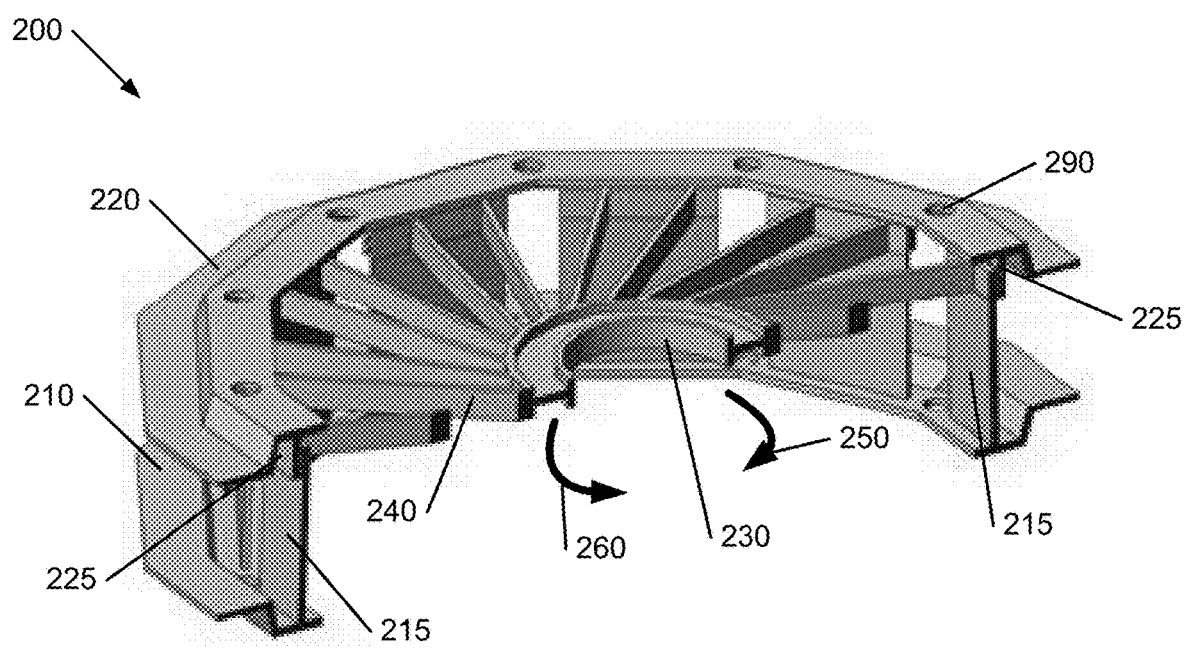
FIG. 2

PRINTED SPACECRAFT SEPARATION SYSTEM

This application is a Divisional of U.S. patent application Ser. No. 14/506,588 filed 3 Oct. 2014, which is incorporated by reference herein, and claims the benefit of U.S. Provisional Patent Application 61/887,616, filed 7 Oct. 2013.

BACKGROUND AND SUMMARY OF THE INVENTION

This invention relates to the field of mechanical connectors, and in particular to connector assemblies for spacecraft stage separation systems, such as satellite and missile systems.

Transport systems, such as rockets that transport satellites into space, vessels that transport submerged sections of ocean structures such as oil platforms, and the like, require a means for securely fastening different items together for transport, and reliably and easily unfastening the items for deployment. Multi-stage rockets also require a means for fastening the stages together, and reliably unfastening the stages as each stage is spent.

A variety of devices have been developed to secure two items together while also allowing the items to be separated quickly and reliably. In the aerospace industry, traditional connection devices include bolts and bands that can be severed. Bolts are used to fasten the two items together, and an explosive charge is typically used to sever the bolts at the proper time, thereby unfastening the two items. Depending upon the application, supplemental devices such as springs may be used to urge the two items apart when the bolts are severed. To assure a reliable separation, the number of bolts used to fasten the two items is kept to a minimum; this results in load points at the bolts far in excess of the load imposed by a distributed fastening system.

Belt structures are commonly used to provide for a distributed load. A belt structure that is commonly employed to fasten items together is a "V-band", typified by U.S. Pat. No. 4,715,565, incorporated by reference herein. The V-band includes a tension belt for securing a plurality of retainers against camming surfaces on flange members on separable spacecraft component parts. A typical V-band embodiment consists of an upper ring attached to the payload, a lower ring attached to the launch vehicle, and a clampband that is circumferentially tensioned to the flanges of the upper and lower rings. The clampband is conventionally tensioned by bolts, and explosive bolt cutters are used to sever the bolts to release the tension.

For V-bands to work properly, the tension required in the clampband is relatively high (about 3800 pounds for a 38 inch diameter; 6800 pounds for a 66 inch diameter), requiring radial stiffeners in the rings. The sudden release of this stored energy generates high shock, and imposes additional requirements on the means used to retain the fast moving clampband and clamps after separation. Because of the high tension requirements, the combined weight of the belt, clamps, and supplemental required devices is substantial (as much as 25 pounds for a 38 inch diameter V-band structure). The high tension requirements of V-bands often require specialized tools and instruments to tension the band. The high tension and high release shock effects also limit the reliable life of the components, thereby limiting the amount of testing that can be applied to the components that are actually flown.

Another structure that is commonly used to provide for an easily separable connection is an explosive frangible joint, as typified by U.S. Pat. Nos. 4,685,376 and 5,390,606. An explosive detonating cord is placed within a contained space that forms the frangible joint between the two items. Separation is achieved by detonating the cord within the contained space, forcing a rapid crack propagation through the frangible joint. Although the weight of an explosive frangible joint is less than that of an equivalent sized V-band, it is still substantial (as much as 17 pounds for a 38 inch diameter joint). The destructive nature of this separation system precludes testing of the joints that are actually flown.

In 1999, Planetary Systems Corporation introduced a spacecraft connection system (the "Lightband") that is light weight, does not use explosives, does not impart a substantial shock to the connected items upon separation, and is non-destructive, allowing for repeated use during testing prior to launch.

As detailed in U.S. Pat. Nos. 6,227,493 and 6,343,770, each incorporated by reference herein, and as illustrated in FIGS. 1A and 1B, the Lightband comprises a first component 110 having a plurality of leaf elements 115 with protrusions, and a second component 120 having recesses 125 for receiving the leaf element protrusions. The protrusions of the leaf elements are secured within the recess by a retaining band, which may be a compressed band, or in an alternative embodiment, an expansion band; the protrusions and recess are formed so as to provide a load and torque bearing surface that requires minimal tension on the tensioned band, or minimal compression on the expansion band. Electric motors 150 are used to transition between a lock state and a release state, each state being mechanically stable (unstressed). When the band is released, springs 130 in the hinge of the leaves 115, or other means, urge the leaves 115 away from the mating surfaces 125, thereby allowing for the separation of the connected items. Springs 140 are also used to urge the second component 120 away from the first component 110. Preferably, the leaves 115 are hinged, allowing for ease of coupling and decoupling to the mating surface 125.

Although the Lightband eliminates the inherent danger of explosives during pre-launch assembly and testing, minimizes the shock effects during separation, and provides a connector component that is stiff, strong, and easy to use, it is fairly expensive to manufacture and assemble. An 8" diameter Lightband, for example, may have as many as 11 leaf elements and hinges that are machined from 0.5" aluminum stock, and the assembly procedure must conform to rigorous standards.

It would be advantageous to reduce the number and cost of parts used in a non-explosive connector assembly. It would also be advantageous to reduce the cost and complexity of the assembly process.

These advantages, and others, are achieved by creating a locking component that can be deformed and placed into a stable state that locks the component into a mating component, and can easily be released from the deformed state, decoupling the two components. The locking component may include a central ring, a plurality of leaf elements arranged at the perimeter of the component, and a plurality of fins that extend outward from the ring to the plurality of leaf elements. A rotation of the ring element while the component is held stationary causes the fins to urge the leaf elements toward the receiving surface areas and to subsequently tension the leaf elements against surfaces on the mating component. To reduce cost and complexity, the locking component is a metal, such as titanium, that can be formed using an additive manufacturing process, commonly termed a 3-D printing process.

BRIEF DESCRIPTION OF THE DRAWINGS

The invention is explained in further detail, and by way of example, with reference to the accompanying drawings wherein:

FIGS. 1A-1B illustrate an example prior art non-explosive spacecraft connection assembly.

FIG. 2 illustrates an example locking component of a connection assembly in accordance with aspects of this invention.

Throughout the drawings, the same reference numerals indicate similar or corresponding features or functions. The drawings are included for illustrative purposes and are not intended to limit the scope of the invention.

DETAILED DESCRIPTION

Figure 3:
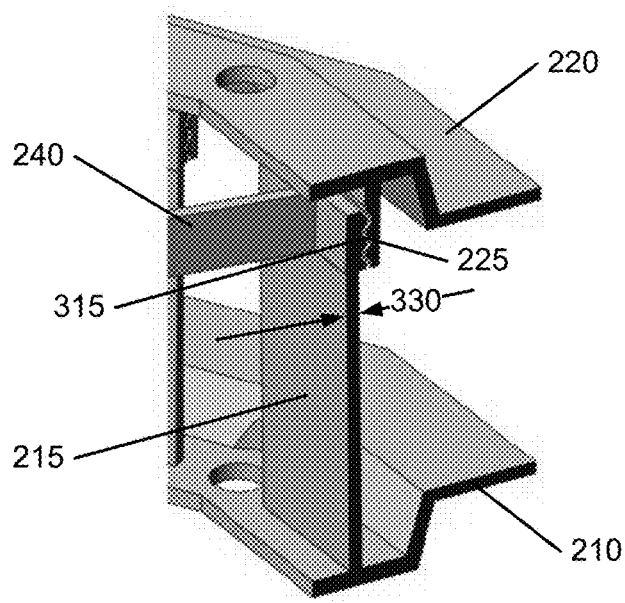
FIG. 3 illustrates a coupling of the example locking component to a mating component.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

In the interest of clarity and ease of understanding, the two elements that are to be coupled together by the connection assembly of this invention are termed "vehicles", because at least one of these elements must be mobile. The term "vehicle" as used herein merely means a structure that is removable from another structure.

FIG. 2 illustrates an example locking component 210 and an example mating component 220 of a connection assembly 200 in accordance with aspects of this invention. In a typical configuration, the locking 210 and mating components will be coupled to vehicles (not shown) that are to be controllably coupled and de-coupled to/from each other. As in the Lightband of FIG. 1A, the locking component 210 includes leaf elements 215 that are designed to engage corresponding receiving surfaces 225 in a mating component 220 of the connection assembly 200. In this example, locking component 210 includes a core element 230, in this case a ring structure, with fins 240 that extend outward from the core element 230 to the leaves 215. The locking and mating components also include features 290, such as bolt holes, that facilitate the fixed attachment of the components 210, 220 to their respective vehicles (not illustrated).

As contrast to the Lightband of FIG. 1A, however, in accordance with an aspect of this invention, the locking component 210 may be a continuously formed, or "integral" component that is created using 3-D printing technology. This integral locking component 210 includes the leaves 215, the core element 230, and the fins 240. It is estimated that the assembly cost for a coupling system using this integral locking component 210 will be at least an order of magnitude less than the assembly cost for the Lightband of FIG. 1A. Additionally, the material cost and total manufacturing time can be expected to be reduced significantly, as detailed further below.

A 3-D printing process, also known as an additive manufacturing (AM) process, is any of various processes for making a three-dimensional object of a desired shape from a 3-D model or other electronic data source, primarily through additive processes in which successive layers of material are laid down under computer control. In a preferred embodiment, the material that is successively laid down for the integral locking component 210 may include Titanium (Ti), or a Titanium alloy, although other materials having high strength and high fracture toughness, such as Aluminum, stainless steel, Inconel and beryllium alloys) may be used. Further, plastics such as nylon and ULTEM may be used when the separable vehicle is relatively light. A combination of materials may also be used.

Any of a variety of techniques may be used to additively produce the locking component 210, including, for example, electron-beam melting (EBM) selective laser melting (SLM), direct metal laser sintering (DMLS), selective laser sintering (SLS), and fused deposition modeling (FDM).

In operation as a coupling system, after fabricating the component 210, if the component 210 is held stationary while the core element 230 is rotated in a clockwise 250 direction (viewed from above), the fins 240 will be urged outward, causing the leaves 215 to also be urged outward. This outward movement will cause the leaves 215 to contact the receiving surfaces 225, and further clockwise 250 rotation will result in continued pressure on the leaves 215, holding them in compression against the surfaces 225.

In like manner, a counter-clockwise 260 rotation of the core element 230 while the component 210 is held stationary will cause the fins 240 to move inward. Because the fins 240 are coupled to, or integral with the leaves 215, this counter-clockwise 260 rotation will cause the leaves 215 to be drawn inward, thereby disengaging the leaves 215 from the receiving surfaces 225 on the mating component 220 of the connection assembly 200.

As detailed further below, the leaves 215 of the component 210 may be formed such that in an "unloaded", or "neutral", or "minimal strain energy" state, the leaves 215 are biased in the inward direction, such that a release of the tension on the core element 230 results in a disengagement of the leaves 215 from the receiving surfaces 225. Alternatively, the leaves 215 of the component 210 may be formed such that in an unloaded/neutral state, the leaves 215 are biased in the outward direction. In this configuration, a release of the tension on the core element 230 results in an engagement of the leaves 215 with the receiving surfaces 225.

FIG. 3 illustrates a coupling of the example locking component 210 to a mating component 220. As illustrated, the leaf element 215 includes a patterned surface 315 that engages a corresponding patterned receiving surface 225. In this example, the pattern is a sawtooth pattern that provides interlocking lateral grooves that prevent separation of the surfaces 315, 225 when the leaf elements 215 are urged outward to engage the receiving surfaces 225 via the clockwise rotation 250 of the core element 230 of FIG. 2.

One of skill in the art will recognize that alternative patterns may be used, preferably based on the expected forces that will be experienced when the components 210, 220 are deployed. For example, if the components 210, 220 are expected to experience a rotational torque, vertical features may be included in the pattern to limit a rotational shift of the surfaces 315, 225 relative to each other.

In an example embodiment, the thickness 330 of the Titanium elements forming the leaf elements 215, fins 225, and core element (not illustrated in FIG. 3) is about 1.5 mm (0.06 inches), which allows for a torque of at least 800 in-lbs to be applied to the core element when the leaf elements 215 are engaged with their receiving surfaces 225, which is sufficient to guarantee that surfaces 315 and 225 will remain coupled when subject to external loading.

In the design of the locking component 210 of FIG. 2, the "neutral" state of the component 210 with respect to the position/orientation of the leaves 215 determines the methods of coupling and decoupling the locking component 210 and the mating component 220. That is, the location/orientation of the leaves 215 when no rotational force is applied to the core element 230 defines the "neutral" state of component 210. If the leaves 215 are extended outward in the neutral state, the coupling of the components 210, 220 will require forcing the leaves 215 inward (rotating the core element 230 counter-clockwise 260) while the receiving areas 225 of the component 220 are placed atop the leaves 215 of the component 210. Thereafter, releasing the inward force enables the leaves 215 to couple with the receiving surfaces 225. A reapplication of the inward force (rotating the core element 230 counter-clockwise 260) enables the leaves 215 to de-couple from the receiving surfaces 225.

If, on the other hand, the leaves 215 are contracted inward in the neutral state, the coupling of the components 210, 220 will require forcing the leaves 215 outward (rotating the core element 230 clockwise 250) after the receiving areas 225 of the component 220 are placed atop the leaves 215 of the component 210. Thereafter, releasing the outward force enables the leaves 215 to decouple from the receiving surfaces 225.

In like manner, if the neutral state situates the leaves 215 in an intermediate position between coupling and decoupling with the surfaces 225, a rotational force will be required to either lock or unlock the leaves 215 to or from the receiving surfaces 225.

In a preferred embodiment for spacecraft coupling, because it is important to assure that the structures being coupled, such as a launch vehicle and its payload, are de-coupled upon deployment, the leaves are biased toward the inward position in the neutral state. With this bias, the likelihood of the coupling being released in the event of a failure of some element of the coupling mechanism is increased. This inward bias of the leaves 215 also allows the leaves 215 to be disengaged from the receiving surfaces 225 with minimal applied force, as detailed further below. In like manner, the rotation of the core element 230 to engage the leaves 215 with the receiving surfaces 225 can easily be performed when the two components 210, 220 are being joined together (on the ground). This inward orientation of the leaves 215 also allows for both components 210, 220 to be formed during the same printing process, as detailed further below.

In other embodiments, such as the coupling of a highway vehicle and its load, the leaves may be biased to the outward position in the neutral state, to increase the likelihood that the load remains coupled to the vehicle in the event of a failure of the coupling mechanism.

Figure 4:
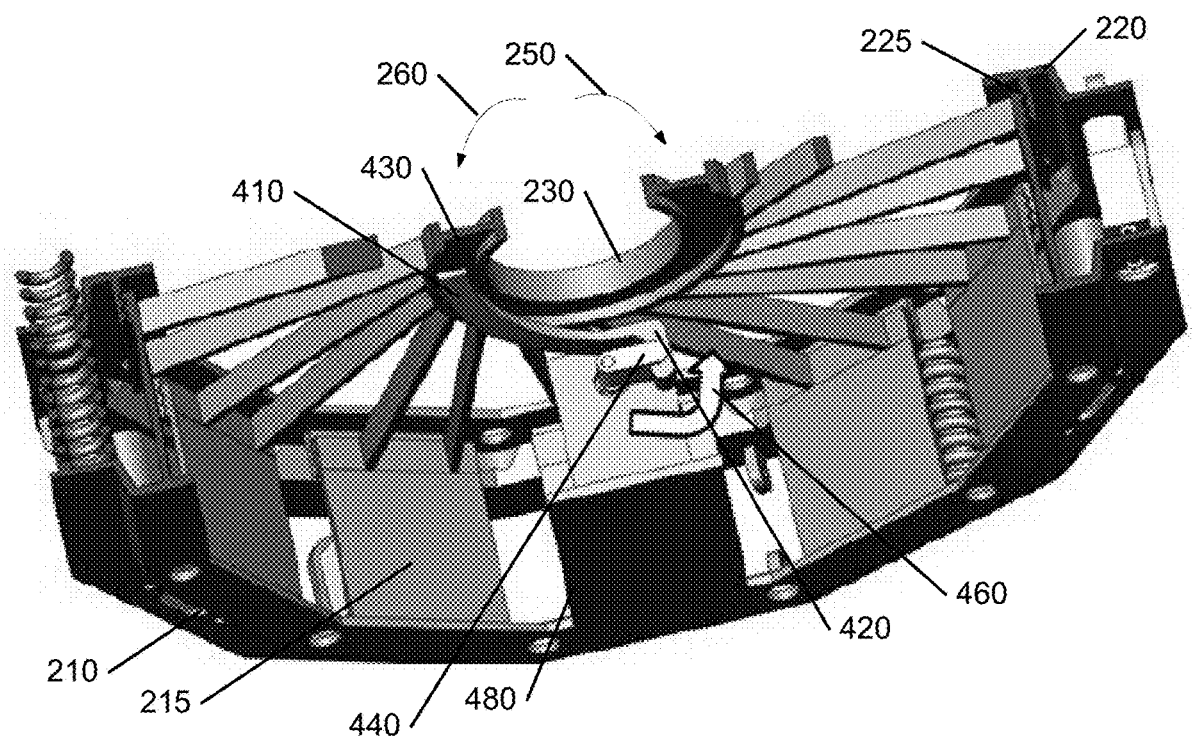
FIG. 4 illustrates a locking and release system for coupling and decoupling the locking component and the mating component.

FIG. 4 illustrates a locking and release system for coupling and decoupling the locking component and the mating component. In this example, a capture bar 410 may be provided to lock the core element 230 in a given rotational position when the core element is rotated to engage the leaves 215 and the receiving surfaces 225. For example, the core element 230 may include a set of ratchet teeth (not illustrated) within a guide area 430, and the distal end of the capture bar may include a feature that engages the ratchet teeth as the core element 230 is rotated clockwise 250, preventing the core element 230 from rotating counter-clockwise 260.

In a preferred embodiment, the capture bar 410 includes an extension 420 that extends perpendicular to the lateral extent of the capture bar 410 and is secured to a lever 440 that extends parallel to the lateral extent of the capture bar 410. With this arrangement, the force exerted by the core element 230 to pull the capture bar 410 to the left is transferred to the lever 440, which opposes movement of the capture bar to the left. In this manner, the core element 230 is held in the tensioned rotational position without an external force being applied. That is, in this configuration, the core element 230 is in a mechanically stable state, wherein absent any external force to force the core element 230 out of this stable state, the core element 230 will remain in its tensioned state.

To place the core element 230 in an untensioned state, thus placing the leaves 215 in a release state, the lever 440 is rotated counter-clockwise 460. As the lever 440 is rotated, the capture bar 410 is displaced from its stable state, allowing the core element 230 to 'unwind' in the counter-clockwise 260 direction, pulling the leaves 215 away from the surface areas on the mating component 220, thereby releasing the mating component 220 from the locking component 210. In an example embodiment, an electric motor (470 of FIG. 7) is used to initiate the rotation of the lever 440, and the locking component 210 includes a shelf or bracket 480 to accommodate the mounting of this motor.

Figure 5:
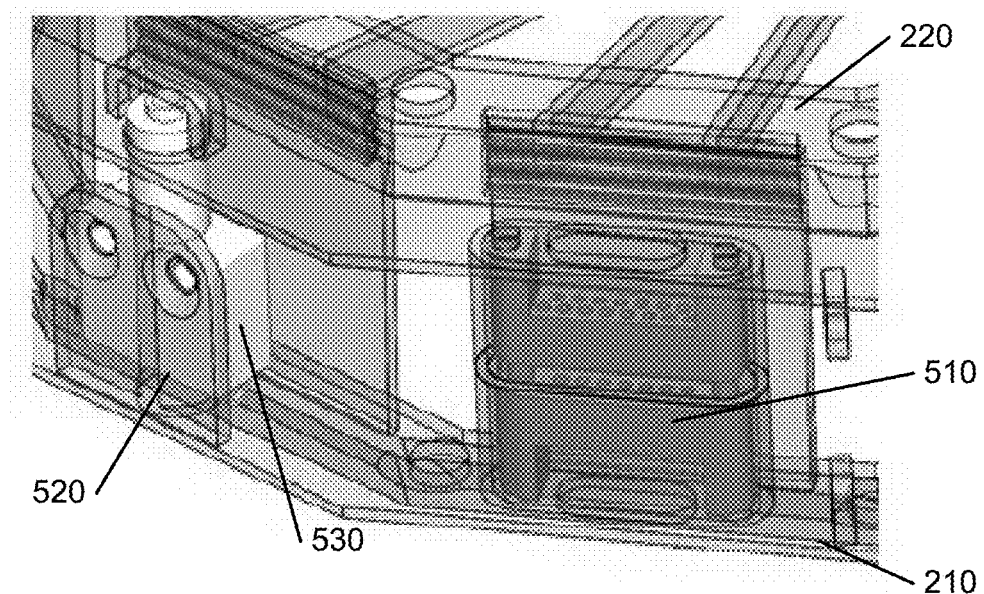
FIGS. 5 and 6 illustrate supplemental features of the locking component and mating component.
Figure 6:
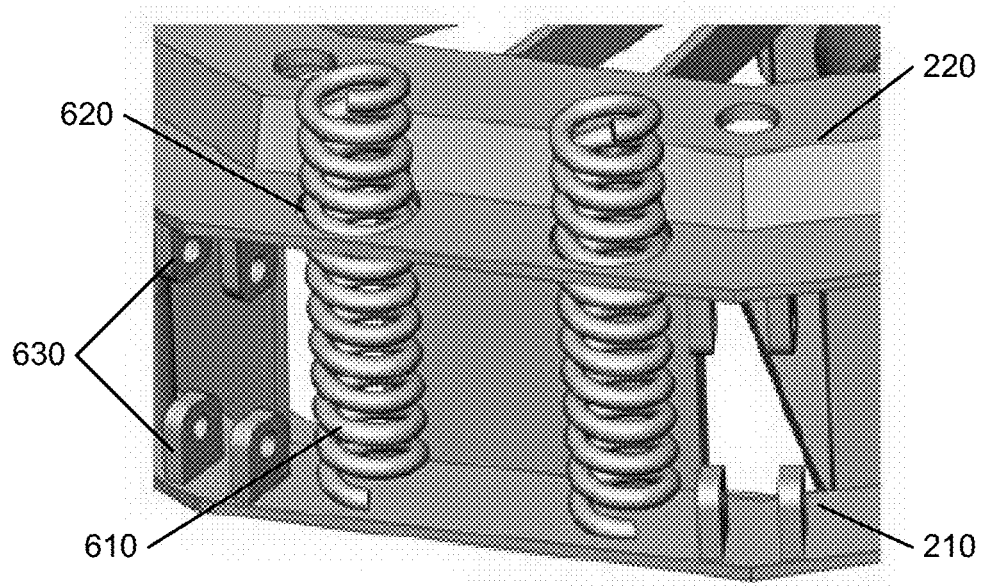

FIGS. 5 and 6 illustrate supplemental features of the locking component 210 and mating component 220. As the term is used herein, a supplemental feature is a feature that is not required for the function of coupling two vehicles together, but added to facilitate other functions.

In many applications, and in particular in spacecraft applications, the two vehicles being coupled by the locking component 210 and mating component 220 need to be able to communicate. In the spacecraft application, for example, the launch vehicle may monitor the status of the payload, or at least monitor the integrity of the coupling of the payload to the launch vehicle. This status information is typically relayed back to the earth stations that are monitoring the launch. Additionally, the mechanism used to initiate the decoupling of the components 210, 220 must receive a 'deploy' command from the launch vehicle at the appropriate time.

In the example embodiment of FIG. 5, the locking component 210 and mating component 220 include the housings 510 and optional brackets 520 into/upon which items such as a separation switch 530 and electrical connectors (not illustrated) may be installed. In like manner, the locking component 210 may include channels or other supplemental features that facilitate routing of electrical cables and the like.

Also in many applications, an active disengagement means is desired/required to assure that the vehicles coupled to the locking component 210 and the mating component 220 are urged away from each other.

In the example embodiment of FIG. 6, springs 610 are formed about the perimeter of the locking component 210. They may alternatively or additionally be formed about the perimeter of the mating component 220.

In this example embodiment, both the locking component 210 and the mating component 220 are formed during the same 3-D printing event. Accordingly, to enable the springs 610 to be in their expanded/neutral state and still provide propulsion to separate the components 210, 220, the springs 610 need to extend beyond the position of the mating component 220 in their neutral state. Accordingly, openings 620 are provided in the mating component 220. These openings 620 will subsequently be closed sufficiently to prevent the springs 610 from extending beyond the component 220, thereby providing an expansive force when the components 210 and 220 are mated to facilitate an urged separation of the vehicles coupled by the components 210, 220.

One of skill in the art will recognize that other supplemental features may be included in the locking component 210 to facilitate operating, testing, and transporting the connector assembly 200 before the connector assembly 200 is coupled to spacecraft and/or payload. For example, in its final configuration, the openings 620 will be closed, and the springs 610 will force the components 210, 220 apart. The locking component 210 and mating component 220 may include features 630 that facilitate holding the components 210, 220 together when the springs are compressed.

In like manner, the locking component 210 may include supplemental features that facilitate testing of the coupling assembly, such as features that enable rapid fastening of the locking component 210 to a test bed so that torque may be applied to the core element 230. Similarly, the locking component may include supplemental features that facilitate transport of the coupling assembly, such as a lifting eye.

Figure 7:
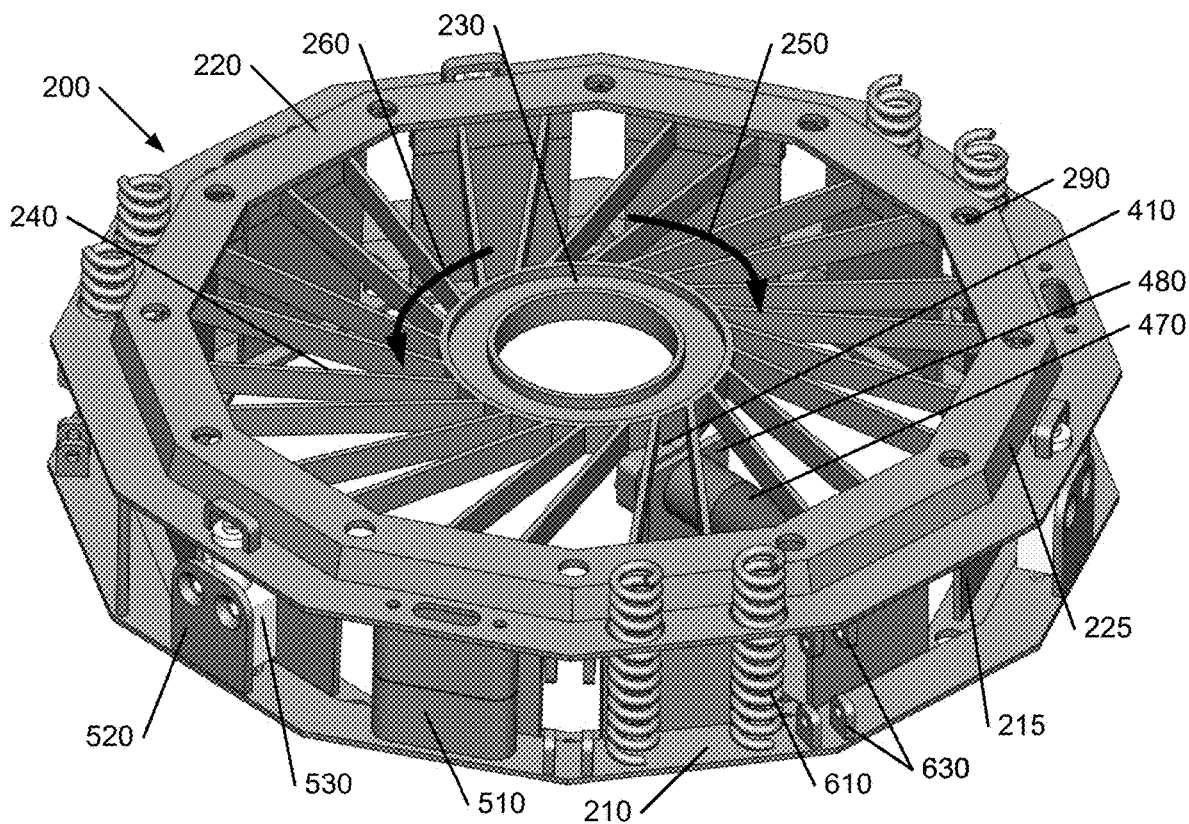
FIG. 7 illustrates an example coupling system with supplemental features.

FIG. 7 illustrates an example coupling system with such supplemental features.

Figure 8:
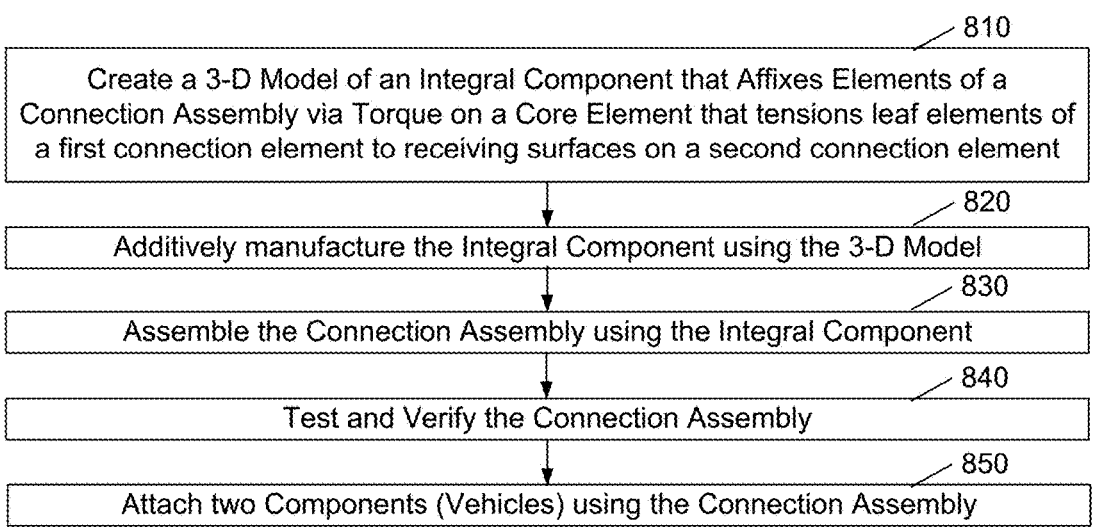
FIG. 8 illustrates an example process for coupling two vehicles using a connection assembly that includes an locking component that securely couples the vehicles.

FIG. 8 illustrates an example process for coupling two vehicles using a connection assembly that includes an integral locking component that securely couples the vehicles.

At 810, a 3-D model of the locking component is created. This locking component includes a core element that, when torqued, tensions leaf elements of a locking connection element to corresponding mating surfaces of a mating connection element. In an alternative embodiment, the leaf elements are tensioned to the corresponding mating surfaces when negatively torqued (i.e. released).

At 820, this 3-D model is provided to an additive process machine, thereby enabling the additive process machine to produce the corresponding integral locking component in a continuous manner, based on the 3-D model.

At 830, other parts of the connection assembly are provided, and the connection assembly is assembled. The assembled connection assembly is tested and verified to conform to given specifications, at 840.

At 850, each of two elements of the assembled connection assembly is attached to one of two vehicles, the two vehicles are joined together, and the core element of the connection assembly is torqued to securely couple the two vehicles.

In a preferred embodiment, the integral locking component 210 and mating component 220 are fabricated using a single additive manufacturing process. It is significant to note that fabricating the integral locking component 210 and mating component 220 using the same 3-D printing event provides a number of advantages, compared to an individual fabrication of each of these components 210, 220.

In the case of the mating of the leaves 215 and the mating surfaces 225, the 3-D model that defines the combination of the two components 210, 220, need merely indicate a space between these elements 215, 225 to assure that the leaves 215 and the surfaces 225 are aligned.

In like manner, as may be appreciated in FIG. 3, given a defined space between the leaves 215 and the surfaces 225, and assuming that the surfaces 225 are rigidly affixed to the component 220, the position/orientation of the leaves 215 will be in the inward orientation, such that the unloaded/neutral position/orientation of the leaves 215 will facilitate a 'default' disengaged state with regard to the surfaces 225.

As will be recognized by one of skill in the art, during the additive process there must be a continuous link among all of the elements of the desired structure. In the case of a combination of the components 210, 220, this continuous link may be provided by sacrificial links, or tabs (not shown) between the components 210, 220. These links may be provided for example by a few tabs along the perimeters of the components 210, 220 that couple the components 210, 220. The tabs are severed after manufacture to provide the individual components 210, 220.

Depending on the relative costs of material and processing, these sacrificial tabs may be a different material than the primary material of the components 210, 220. For example, the tabs may be a plastic or other material that can easily be removed from the basic material comprising the components 210, 220. In some embodiments, the material used to couple the components 210, 220 during the 3-D printing process may be a material that melts, dissolves, or otherwise decouples itself from the components 210, 220 given a particular control environment.

As noted above, the use of an integral locking component 210 provides significant advantages compared to conventional coupling systems, such as the Lightband of FIG. 1. Of particular note is the savings achieved with regard to the assembly of the coupling system, as well as the reduction in material costs and other manufacturing tasks, such as testing.

The components of the Lightband of FIG. 1 are generally formed using a subtractive manufacturing process, such as precision milling of stock material. The cost of the material that is removed to form the components is included in the material cost of the component. In an additive process, on the other hand, material is only used where it is required to form the component and any required sacrificial portions; generally, the cost of the sacrificial material in the additive manufacturing process is substantially less than the cost of the removed material in a subtractive manufacturing process.

The use of an integral locking component also reduces the time required to design, analyze, and test the coupling system. In the example of the Lightband, hundreds of parts are used, and the interfaces between and among these parts (e.g. hinges, bands, etc.) must be finely designed, analyzed, and tested. Typically, finite element analysis (FEA) is used to assess the structural integrity of such a mechanical system, and modeling the interfaces between and among elements of the system is a challenging task, often requiring extensive testing to verify the models used for these interfaces. With an integral locking component, such modeling is simplified, because there are no interfaces, per se, between different parts.

In like manner, because the integral locking component may generally be assumed to have a uniform consistency of material, and finite element analysis can verify the structural integrity of the design, testing after manufacturing can be simplified. The aforementioned interfaces among the elements of a mechanical system are generally the locale for failures of the system, and the testing of the system must address all of these interfaces. With substantially fewer discrete elements in a system with an integral locking component such as defined herein, the number of interfaces is substantially reduced, thereby simplifying the testing process.

In like manner, the use of discrete parts complicates other analysis and testing tasks, such as thermal and electrical analyses and subsequent testing. The integral locking component, on the other hand, simplifies such analyses and test, thereby further reducing the cost to design, manufacture, and test the coupling system that uses the integral locking component. This reduction in the time required to design and analyze the coupling system may also allow additional time to further optimize the design.

Additionally, the assembly of discrete parts, as in the Lightband of FIG. 1, introduces a "tolerance buildup" and each part must be designed to strict tolerances to prevent this buildup from exceeding specifications. The integral locking component, on the other hand, will not experience this tolerance buildup, thereby further simplifying the design and testing of the coupling system.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the core element 230 is illustrated as having a circular inner section; one of skill in the art would recognize that other shapes, such as a square or star shaped inner section may facilitate the torquing process using conventional tools. In like manner, the perimeter of the core element 230 and the perimeter of the arrangement of leaf elements 215 are illustrated as being circular. Although a circular arrangement facilitates a uniform application of compressive load to each leaf element 215, one of skill in the art would recognize that other shapes may be used if such uniformity is not required, or if the fins 240 are suitably designed to provide a substantially uniform compressive load with the leaf elements 215 arranged in a non-circular shape. In like manner, the coupling of the core element 230 and the fins 240 may be structured to reduce the torque required to rotate the core element 230. For example, the juncture of each fin 240 and the core element 230 may be formed using a material or shape that is more flexible than the remainder of the fin 240. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) any of the disclosed devices or portions thereof may be combined together or separated into further portions unless specifically stated otherwise;
e) no specific sequence of acts is intended to be required unless specifically indicated; and
f) the term "plurality of" an element includes two or more of the claimed element, and does not imply any particular range of number of elements; that is, a plurality of elements can be as few as two elements, and can include an immeasurable number of elements.

I claim:

1. A connector assembly comprising:
a locking component that includes:
a core element situated at a center of the locking component;
a plurality of leaf elements arranged at a perimeter of the locking component;
a plurality of fins that extend outward from the core element to the plurality of leaf elements; and
a mating component that includes a plurality of receiving surface areas corresponding to each of the plurality of leaf elements;
wherein:
a rotation of the core element while the locking component is stationary causes the fins to urge the leaf elements toward the receiving surface areas and to subsequently force the leaf elements against the receiving surface areas.

2. The connector assembly of claim 1, including a locking element that maintains the force on the leaf elements while in a mechanically stable state.

3. The connector assembly of claim 2, including a release element that places the locking component in a mechanically unstable state, causing the locking element to release the force on the leaf elements, thereby decoupling the locking and mating components.

4. The connector assembly of claim 3, wherein the locking element includes a lever, and the release element places the locking component in the mechanically unstable state by rotating the lever.

5. The connector assembly of claim 4, wherein the release element includes an electric motor.

6. The connector assembly of claim 1, wherein each leaf element includes a non-planar surface facing its corresponding receiving surface area, and the corresponding receiving surface areas includes a complementary non-planar surface for receiving the leaf elements.

7. The connector assembly of claim 6, wherein at least one of the non-planar surface or the complementary non-planar surface includes one or more grooves.

8. The connector assembly of claim 1, wherein each of the locking and mating components include features that facilitate coupling the locking and mating components to two vehicles that are to be coupled together.

9. The connector assembly of claim 8, including the two components.

10. The connector assembly of claim 9, wherein the two components include a spacecraft delivery component and a payload component.

11. The connector assembly of claim 1, including springs that urge the mating component away from the locking component when the force on the leaf elements is released.

12. The connector assembly of claim 1, wherein the core element, the leaf elements, and the fins are segments of a single integral component.

13. The connector assembly of claim 12, wherein the single integral component is a printed component.

14. The connector assembly of claim 12, wherein the single integral component is a printed titanium component.

15. The connector assembly of claim 12, wherein the single integral component includes supplemental structures that accommodate electrical components.

16. The connector assembly of claim 12, wherein the single integral component includes supplemental features that facilitate routing of electrical cables.

17. The connector assembly of claim 12, wherein the single integral component includes supplemental features that facilitate coupling of the locking and mating components without urging the leaf elements toward the receiving surface areas.

18. The connector assembly of claim 12, wherein the single integral component includes supplemental features that facilitate testing of the connector assembly.

19. The connector assembly of claim 12, wherein the single integral component includes supplemental features that facilitate transport of the connector assembly.

20. The connector assembly of claim 12, including springs that urge the mating component away from the locking component when the force on the leaf elements is released, wherein the springs are also segments of the single integral component.

* * * * *